(12) United States Patent
Shue (10) Patent No.: US 8,313,274 B2
(45) Date of Patent: Nov. 20, 2012

(54) THREADLESS NUT

(75) Inventor: Larry N. Shue, Woodville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 12/902,469

(22) Filed: Oct. 12, 2010

(65) Prior Publication Data

US 2011/0027048 A1    Feb. 3, 2011

Related U.S. Application Data

(62) Division of application No. 12/463,788, filed on May 11, 2009, now Pat. No. 8,024,944.

(51) Int. Cl.
*F16B 21/00* (2006.01)
(52) U.S. Cl. .................................................. 411/349
(58) Field of Classification Search .............. 411/347, 411/349, 549, 552, 553, 918; 24/663
See application file for complete search history.

(56) References Cited

U.S. PATENT DOCUMENTS

| | | | |
|---|---|---|---|
| 1,832,080 A | 11/1931 | Allen | |
| 1,843,160 A | 2/1932 | Ingle | |
| 2,442,064 A * | 5/1948 | Veit | 411/349 |
| 2,483,660 A | 10/1949 | Morris et al. | |
| 2,839,808 A * | 6/1958 | Zahodiakin | 411/551 |
| 2,900,697 A * | 8/1959 | Cuss | 411/349 |
| 3,123,880 A * | 3/1964 | Barry et al. | 411/352 |
| 3,152,822 A * | 10/1964 | Griffiths | 292/61 |
| 3,171,182 A * | 3/1965 | Danehy | 411/552 |
| 3,281,228 A | 10/1966 | Anderson | |
| 3,472,742 A | 10/1969 | Irwin | |
| 3,554,075 A * | 1/1971 | Johnson | 411/349 |
| 4,004,905 A | 1/1977 | Mumford | |
| 4,308,646 A * | 1/1982 | Schenk | 411/554 |
| 4,453,964 A | 6/1984 | Parkell | |
| 4,522,541 A * | 6/1985 | Bidwell | 411/554 |
| 4,610,713 A | 9/1986 | Clegg | |
| 4,618,356 A | 10/1986 | Hirt et al. | |
| 4,657,462 A * | 4/1987 | Hoen | 411/552 |
| 4,659,203 A | 4/1987 | Niwa et al. | |
| 4,756,638 A | 7/1988 | Neyret | |
| 4,901,987 A * | 2/1990 | Greenhill et al. | 267/166 |
| 5,290,335 A | 3/1994 | Stewart | |
| 5,545,167 A * | 8/1996 | Lin | 606/278 |
| 5,858,050 A | 1/1999 | Slocum et al. | |
| 6,279,710 B1 | 8/2001 | Kubo | |
| 6,292,142 B1 | 9/2001 | Pittman | |
| 6,318,338 B1 | 11/2001 | Kawamura | |
| 6,880,806 B2 * | 4/2005 | Haikawa et al. | 251/292 |
| 6,971,847 B2 * | 12/2005 | Tiemann | 415/209.2 |
| 2002/0118536 A1 | 8/2002 | Wu | |
| 2008/0184742 A1 | 8/2008 | Mohr | |

* cited by examiner

*Primary Examiner* — Gary Estremsky (57) ABSTRACT

A threadless nut including radially inwardly extending translational retention lugs circumferentially spaced apart and positionable behind lugs of a stud when the nut is coupled to the stud, and radially inwardly extending rotational retention lugs circumferentially spaced apart and positioned adjacent to the translational retention lugs, and positionable adjacent to the stud lugs such that the rotational retention lugs are axially overlappable with respect to the stud lugs when the nut is coupled to the stud, wherein the translational and rotational retention lugs define seats to receive the translational retention lugs and define passages circumferentially between the seats to allow passage of the stud lugs, the rotational retention lugs being axially movable with respect to the stud lugs, and rotatably movable with respect to the stud lugs when the rotational retention lugs are axially moved with respect to the stud lugs so as to axially clear the stud lugs.

14 Claims, 12 Drawing Sheets

THREADLESS NUT

This application is a division of application Ser. No. 12/463,788 filed May 11, 2009.

The present disclosure is directed to fasteners and, more particularly, to threadless nuts.

BACKGROUND AND SUMMARY OF THE DISCLOSURE

Tool-driven threaded fasteners, such as nuts and bolts, are ubiquitous in industry. Such fasteners may come loose and require use of tools for assembly and disassembly, and/or torque monitoring equipment to prevent under or over tightening. One exemplary use of a threaded nut and stud is illustrated in U.S. Patent Application Publication 2008/0184742, which is directed to a glassware manufacturing apparatus including a nut threaded to a stud of a baffle manifold wherein the stud extends through a collar of a baffle arm. Other attempts to couple a baffle manifold to a baffle arm include threaded or threadless clamp collars, and baffle collars pinned to the manifold stud. But such attempts also require tools for assembly and disassembly.

A general object of the present disclosure, in accordance with one aspect of the disclosure, is to provide a threadless nut that does not necessarily require use of tools or torque monitoring equipment.

The present disclosure embodies a number of aspects that can be implemented separately from or in combination with each other.

In accordance with one aspect of the disclosure, a quick-connect/disconnect arrangement for mounting a baffle manifold on a baffle arm of a glassware forming machine includes a baffle arm having an aperture, and a baffle manifold having a segment extending through the aperture and permitting rotation of the baffle manifold with respect to the baffle arm. The arrangement also includes a threadless nut, and a bayonet connection is provided between the threadless nut and the baffle manifold segment.

In accordance with another aspect of the disclosure, there is provided a threadless nut that includes a collar, and a lock coupled to the collar and including a portion carrying circumferentially spaced translational retention lugs and circumferentially spaced rotational retention lugs positioned adjacent to the translational retention lugs, wherein the translational and rotational retention lugs define stud lug seats and stud lug clearance passages therebetween.

In accordance with a further aspect of the disclosure, there is provided a threadless nut that includes a collar including an axially extending wall, a radially extending wall, and circumferentially spaced translational retention lugs extending radially inwardly from the radially extending wall. Also, a lock is coupled to the collar and includes a portion carrying circumferentially spaced rotational retention lugs positioned adjacent to and axially overlapping the translational retention lugs in a rest position. The lock is axially movable with respect to the collar, and the retention lugs define stud lug seats and stud lug clearance passages therebetween.

In accordance with an additional aspect of the disclosure, there is provided a threadless nut that includes translational retention lugs circumferentially spaced apart and positionable behind lugs of a stud when the threadless nut is coupled to the stud. Also, rotational retention lugs are circumferentially spaced apart and positioned adjacent to the translational retention lugs, and positionable adjacent to the stud lugs such that the rotational retention lugs are axially overlappable with respect to the stud lugs when the threadless nut is coupled to the stud. Further, the translational and rotational retention lugs define seats to receive the stud lugs and define passages circumferentially between the seats to allow passage of the stud lugs, the rotational retention lugs being axially movable with respect to the stud lugs, and rotatably movable with respect to the stud lugs when the rotational retention lugs are axially moved with respect to the stud lugs so as to axially clear the stud lugs.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figures 1, 2, 3:
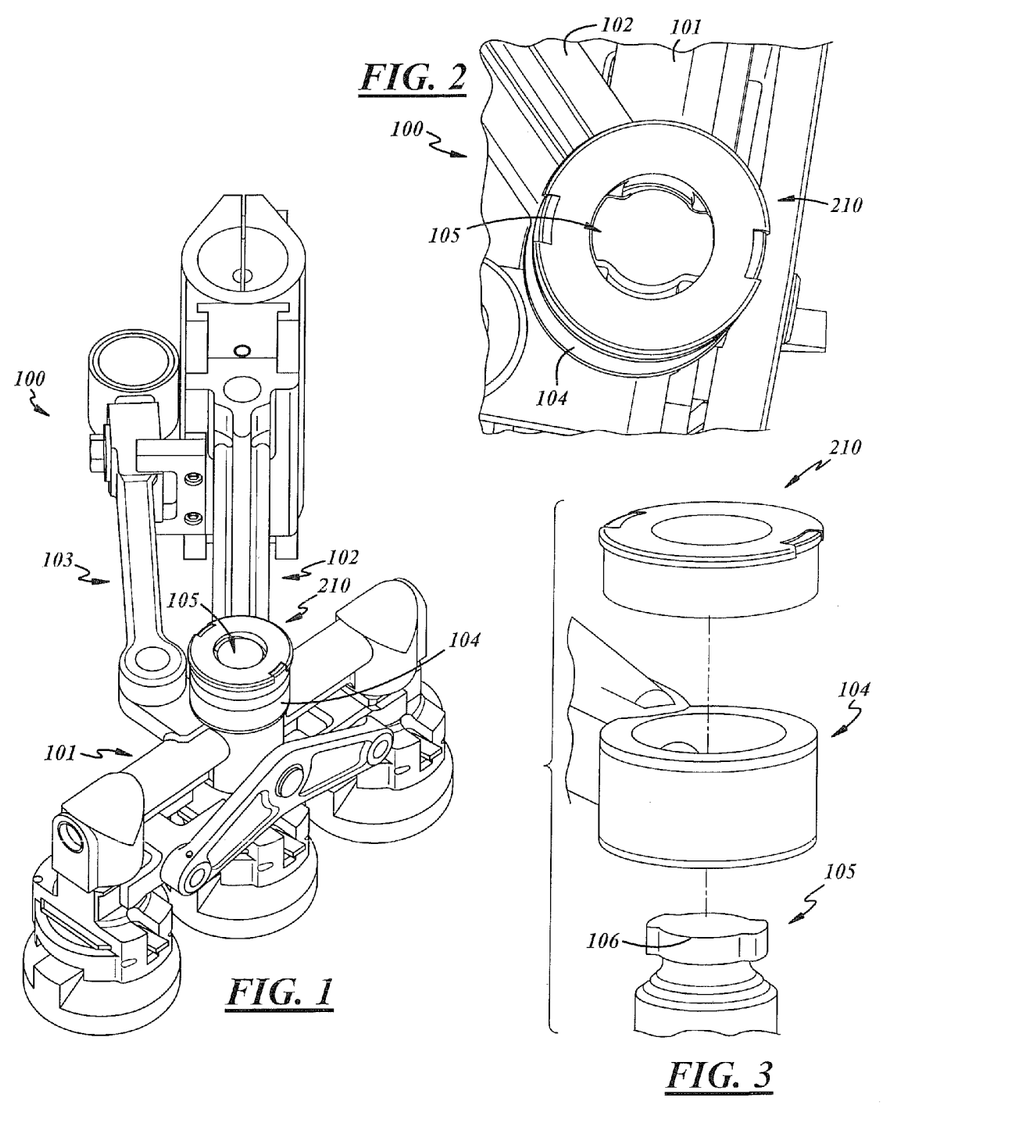
FIG. 1 is a front perspective view of a baffle arm assembly including a threadless connection between a threadless stud and a threadless nut in accordance with a first exemplary embodiment of the present disclosure.
FIG. 2 is an enlarged, fragmentary, upper perspective view of the threadless nut of FIG. 1.
FIG. 3 is an enlarged, fragmentary, exploded perspective view of a portion of the baffle arm assembly of FIG. 1.

FIG. 1 illustrates a baffle arm assembly 100 of a glassware forming machine that may be similar to that disclosed in U.S. Patent Application Publication 2008/0184742, except for features of the present disclosure, which will be described in detail below. The assembly 100 includes a baffle holder manifold 101 suspended from ends of a baffle arm 102 and a link arm 103. The baffle arm 102 includes a collar 104 defining an aperture through which a segment 105 of the manifold 101 extends. The segment 105 is rotatable within the aperture of the collar 104 to allow rotation of the baffle manifold 101 with respect to the baffle arm 102.

FIG. 2 illustrates a quick-connect/disconnect arrangement for mounting the baffle manifold 101 on the baffle arm 102. For example, a threadless nut 210, according to a first exemplary embodiment of the present disclosure, is secured to the segment 105 to couple the manifold 101 to the baffle arm 102. As will be described in greater detail below, the nut 210 may be coupled to the segment 105 via a bayonet connection. The collar 104 may also include a bushing, bearing, or the like (not shown) to facilitate rotation of the manifold segment 105 and the threadless nut 210 with respect to the collar 104. As shown in FIG. 3, the segment 105 includes a threadless stud 106 to extend beyond an upper surface of the collar 104 and to be coupled to the threadless nut 210. (As used herein, directional words such as top, bottom, front, rear, behind, upper, lower, radial, circumferential, lateral, longitudinal, transverse, vertical, horizontal, and the like are employed by way of description and not necessarily limitation.)

Figure 4:
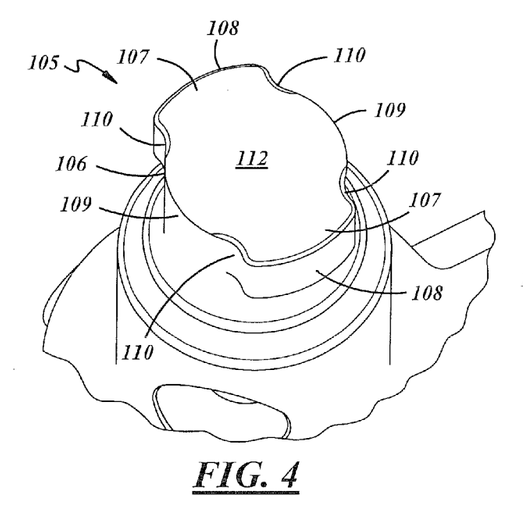
FIG. 4 is an enlarged, fragmentary, upper perspective view of an exemplary threadless stud of the baffle arm assembly of FIG. 1.
Figure 5:
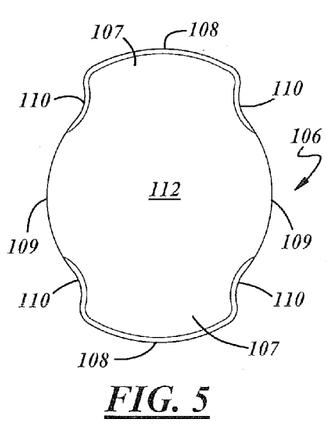
FIG. 5 is an enlarged top view of the threadless stud of the baffle arm assembly of FIG. 1.
Figure 6:
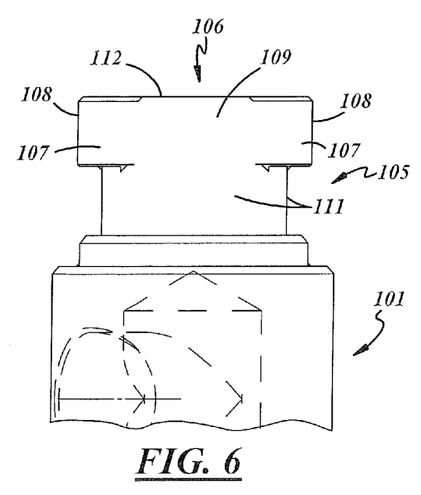
FIG. 6 is an enlarged, fragmentary, side view of the threadless stud of the baffle arm assembly of FIG. 1.

Referring to FIGS. 4-6, the stud 106 includes two or more circumferentially spaced lugs 107. The lugs 107 may have end surfaces 108, side surfaces 109, and fillets 110 therebetween. The end surfaces 108 may be excurvate in shape and may define a major diameter of the stud 106. The side surfaces 109 also may be excurvate and may be axial extensions of a minor diameter 111 (FIG. 6) of the stud 106. The fillets 110 may be incurvate and may define smooth transitions between the end and side surfaces 108, 109 of the stud 106. As shown, the stud 106 may be chamfered to promote good assembly of the nut 200. For example, the stud 106 may be chamfered between a top surface 112 and the end surfaces 108 and fillets 110. Any other suitable configuration of the segment 105 and stud 106 may be used. For example, although the illustrative stud 106 includes two diametrically opposed lugs 107, a stud may include three or more circumferentially spaced apart lugs.

Figure 7:
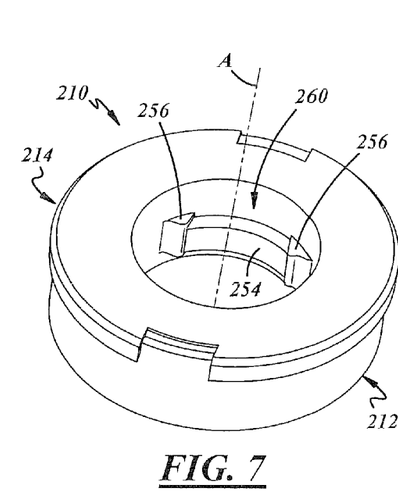
FIG. 7 is an enlarged perspective view of the threadless nut of FIG. 1.
Figures 8, 9, 10:
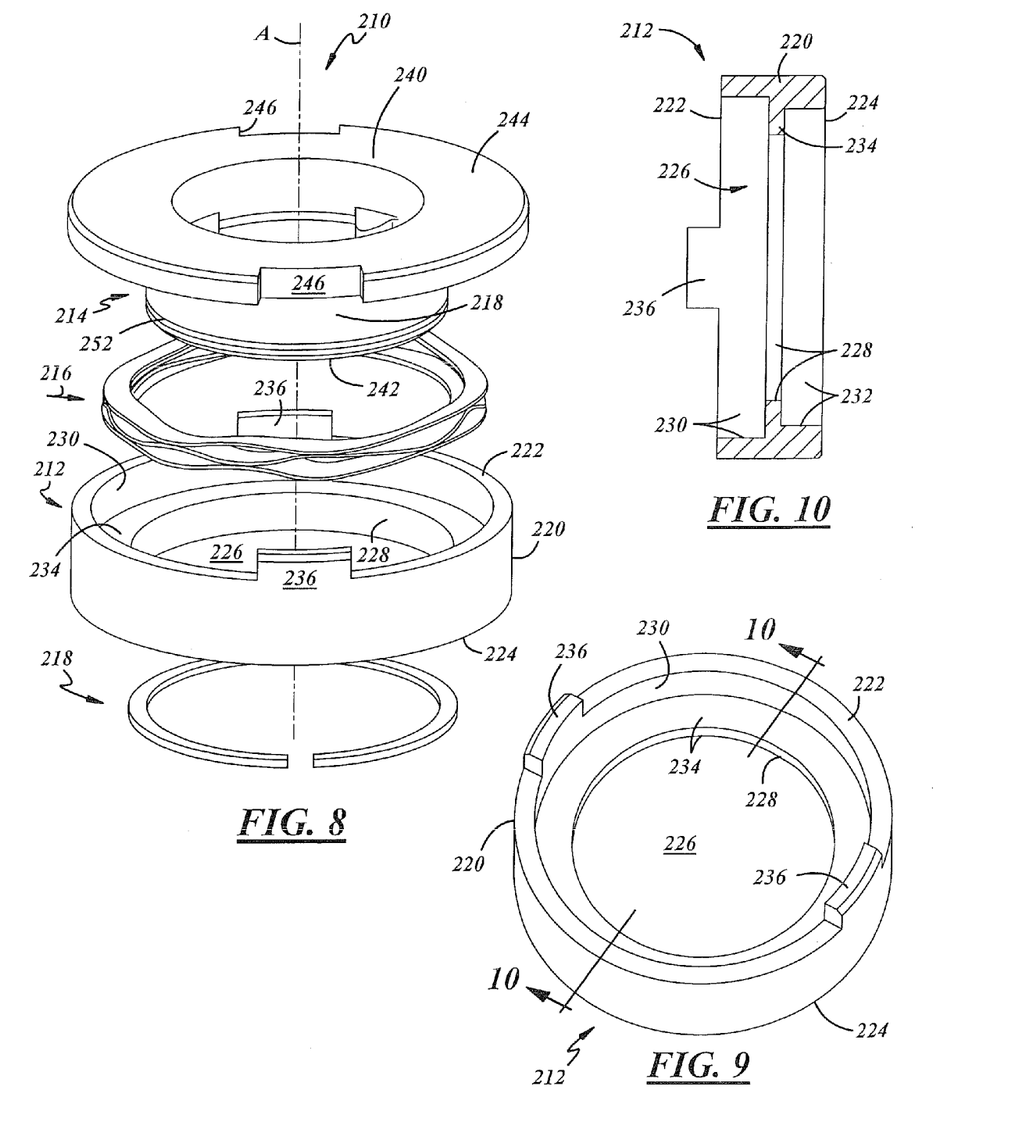
FIG. 8 is an enlarged, exploded, perspective view of the threadless nut of FIG. 1.
FIG. 9 is an enlarged perspective view of a collar of the threadless nut of FIG. 1.
FIG. 10 is a cross-sectional view of the collar of FIG. 9, taken along line 10-10 of FIG. 9.

Referring now to FIGS. 7 and 8, the nut 210 generally includes a longitudinal axis A, a collar 212, and a cap or lock 214 carried by the collar 212 in any suitable manner. For example, the lock 214 is coupled to the collar 212 in a rotationally fixed but axially movable manner. The nut 210 may be a generally cylindrical device, wherein the collar 212 and the lock 214 may be generally cylindrical components. As shown in FIG. 8, the nut 210 also includes a spring 216 to bias the collar 212 and the lock 214 in a general direction away from one another, and a retainer 218 to retain the lock 214 to the collar 212. To assemble the nut 210, the spring 216 is disposed between the collar 212 and the lock 214, the lock 214 is compressed against the spring 216 and the collar 212, and the retainer 218 is coupled to the lock 214 while the lock 214 is compressed against the collar 212. Once the retainer 218 is coupled to the lock 214, compression on the lock 214 may be released. Thus, the nut 210 may be a self-contained assembly.

Referring generally to FIGS. 8-10, the collar 212 includes an axially extending wall 220 extending axially between first and second ends 222, 224, and a stepped passage 226 surrounded by the wall 220. The passage 226 may be defined by a minor diameter 228, a first counterbore 230, and a second counterbore 232 (FIG. 10) that define a radially extending wall 234. The collar 212 also includes lugs 236 projecting axially from the axially extending wall 220 at the first end 222.

Referring generally to FIGS. 8 and 11-13 the lock 214 includes an axially extending wall 238 (FIG. 13) extending between first and second ends 240, 242 (FIGS. 8 and 13) and a radially extending lug flange 244 that extends radially outwardly from the wall 238 and including lug pockets 246. The lock 214 also includes a barrel outer diameter 248 (FIG. 13) to cooperate with the minor diameter 228 of the collar 212, and a shoulder outer diameter 250 (FIG. 13) to cooperate with the first counterbore 230 of the collar 212. The lock 214 further includes a retainer groove 252 (FIGS. 8 and 13) in the wall 238 adjacent the second lock end 242. The lock 214 also carries translational retaining lugs 254 (FIG. 12) and rotational locking lugs 256, wherein the translational retaining lugs 254 are disposed circumferentially between the rotational retaining lugs 256. For example, the lock 214 includes an inner surface 258 from which the lugs 254, 256 inwardly project. The lugs 254, 256 define stud lug seats 260 and semi-circumferential stud lug clearance passages 262 therebetween. The two stud lug seats 260 correspond to the two stud lugs 107 of the stud 106 of FIGS. 4-6, but any suitable quantity of corresponding seats 260 and lugs 107 may be provided.

Figures 11, 12, 13, 14:
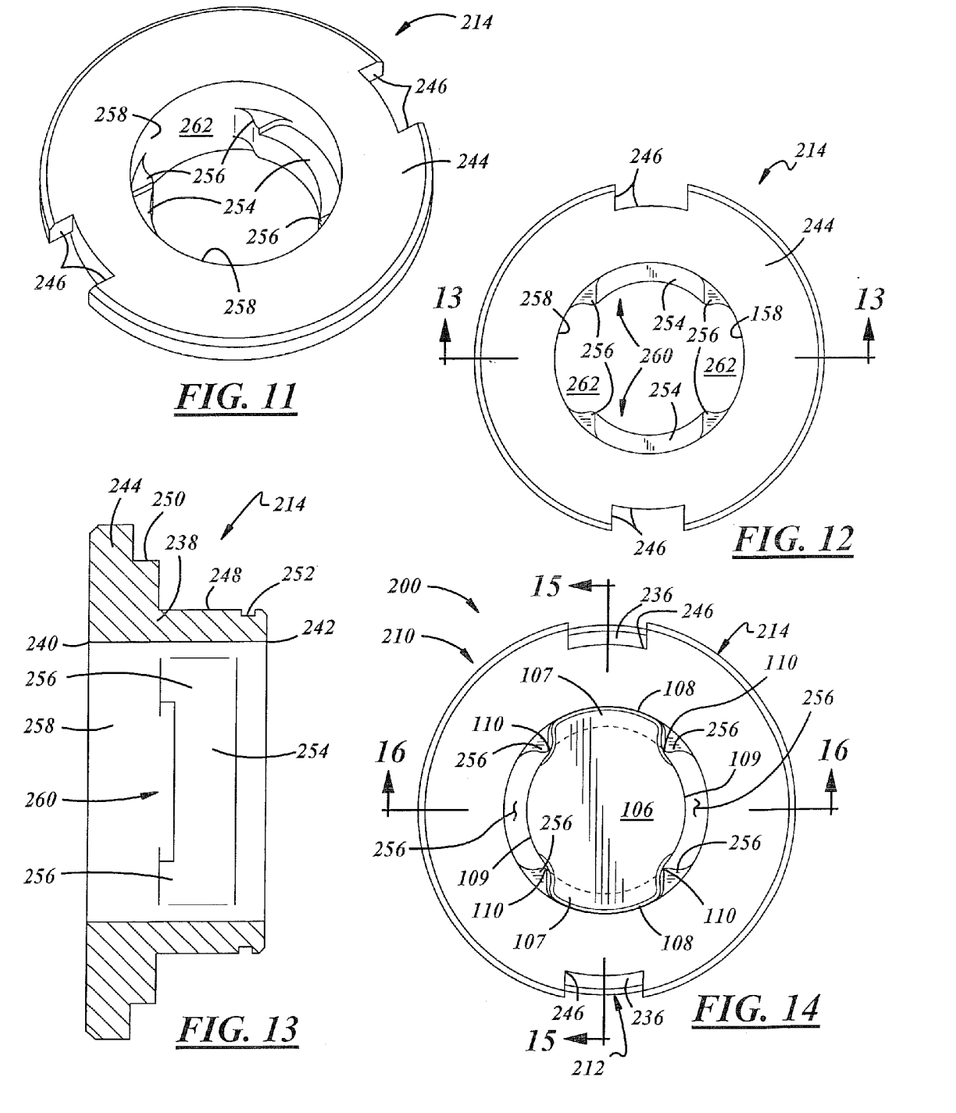
FIG. 11 is an enlarged perspective view of a cap of the threadless nut of FIG. 1.
FIG. 12 is a top view of the cap shown in FIG. 11.
FIG. 13 is a cross-sectional view of the cap shown in FIG. 11, taken along line 13-13 of FIG. 12.
FIG. 14 is an enlarged top view of the threadless nut and stud of FIG. 1.

As assembled, and referring to FIG. 14, the lock 214 is rotationally coupled to the collar 212 by the collar lugs 236, which axially extend into the lug pockets 246 of the lock 214 and are axially movable therein. The rotational locking lugs 256 are disposed in the radial fillets 110 of the stud 106 and cooperate with the radial end and side surfaces 108, 109 of the stud 106 to resist rotation of the nut 210 with respect to the stud 106.

Figure 15:
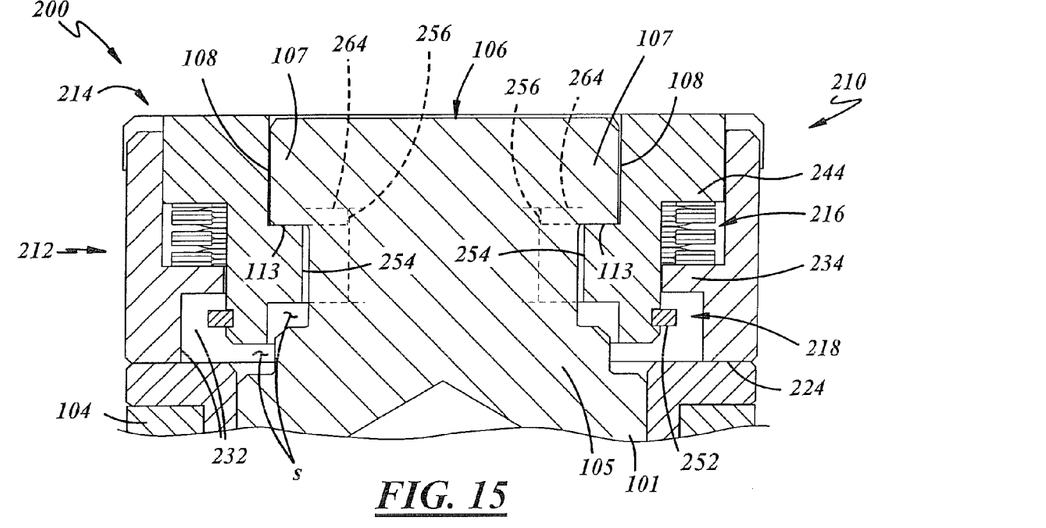
FIG. 15 is a cross-sectional view of the threadless nut of FIG. 1, taken along line 15-15 of FIG. 14.

As shown in FIG. 15, the spring 216 is disposed between the radially extending flange 244 of the lock 214 and the radially extending wall 234 of the collar 212 to bias the lock 214 and collar 212 in a general direction away from each other. The spring 216 also biases the threadless nut 210 with respect to the baffle manifold segment 105 to resist rotation of the threadless nut 210 with respect to the segment 105 absent compression of the spring 216. The spring 216 may be a wave spring. For example, the spring 216 may be a C200-M1 wave spring available from Smalley Steel Ring Company of Lake Zurich, Ill. Any other suitable type of spring may be used, including coil springs, elastomeric springs, or the like.

As also shown in FIG. 15, the retainer 218 is disposed in the retainer groove 252 of the lock 214 such that the retainer 218 is disposed in the second counterbore 232 of the collar 212 and engages the radially extending wall 234 in a free state of the nut 210. The retainer 218 may be a snap ring. For example, the retainer may be a M2400 external retaining ring available from Truarc Company LLC of Phillipsburg, N.J. In another embodiment, the retainer 218 may be an integral portion of the lock 214, for example, a flange which may be upset, for example, after assembly of the collar 212, lock 214, and spring 216.

Figure 16:
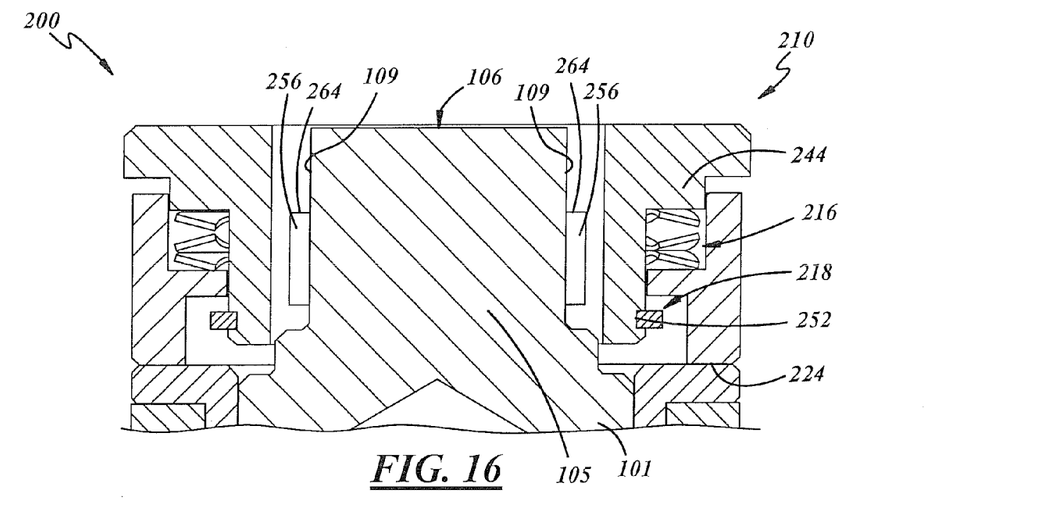
FIG. 16 is a cross-sectional view of the threadless nut of FIG. 1, taken along line 16-16 of FIG. 14.

Referring to FIGS. 14 through 16, the second end 224 of the collar 212 rests against a surface, for example, a surface of the baffle arm collar 104. Also, the translational retaining lugs 254 are disposed behind the stud lugs 107 to axially retain the nut 210 to the stud 106. Furthermore, the rotational locking lugs 256 are disposed adjacent the stud lugs 107 and axially overlap the side surfaces 109 of the stud lugs 107.

When it is desired to decouple the nut 210 from the stud 106, the lock 214 is compressed toward the collar 212 against the bias force imposed by the spring 216. Eventually, as the lock 214 is displaced toward the collar 212, the rotational retention lugs 256 become rotatably movable with respect to the stud lugs 107 when the rotational retention lugs 256 have axially moved with respect to the stud lugs 107 so as to axially clear the stud lugs 107. For example, the top surfaces 264 of the rotational locking lugs 256 axially clear bottom surfaces 113 of the stud lugs 107 to permit the nut 210 to be rotated with respect to the stud 106. In the illustrated embodiment, when the nut 210 is rotated about 90 degrees, the stud lugs 107 may pass through the stud lug clearance passages 262 between the lugs 254, 256 so that the nut 210 may be removed from the stud 106.

To replace the nut 210, the nut 210 is placed over the stud 106 so that the stud lugs 107 pass through the stud lug clearance passages 262 between the lugs 254, 256, the nut 210 is advanced against the baffle arm collar 104 so that the lock 214 is compressed against the nut collar 212 such that the top surfaces 264 of the rotational locking lugs 256 axially clear the bottom surfaces 113 of the stud lugs 107 to permit the nut 210 to be rotated with respect to the stud 106. In the illustrated embodiment, when the nut 210 is rotated about 90 degrees the translational retaining lugs 254 are disposed behind the stud lugs 107 such that when the compression on the lock 214 is released, the spring 216 advances the lock 214 against the stud lugs 107 so as to seat the stud lugs 107 in the lug seats 260 axially against the translational retaining lugs 254 and circumferentially against and between the rotational locking lugs 256.

Accordingly, as assembled to the stud 106, the collar 212 is an axially stationary and circumferentially rotatable member of the nut 210, whereas the lock 214 is a member of the nut 210 that is both axially translatable and circumferentially rotatable.

FIGS. 17 through 33 illustrate another exemplary embodiment of the present disclosure. This embodiment is similar in many respects to the embodiment of FIGS. 7 through 16 and may be used within the exemplary environment of FIGS. 1 through 6, and like numerals between the embodiments designate like or corresponding elements throughout the several views of the drawing figures. Accordingly, much of the common subject matter will generally not be repeated here and the embodiments are incorporated by reference into one another.

Figure 17:
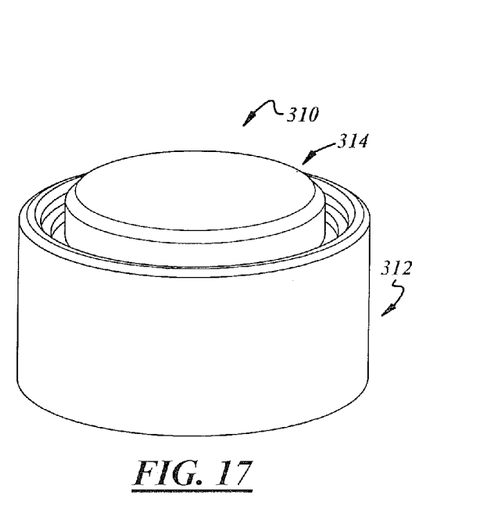
FIG. 17 is an upper perspective view of a threadless nut in accordance with a second exemplary embodiment of the present disclosure.
Figure 18:
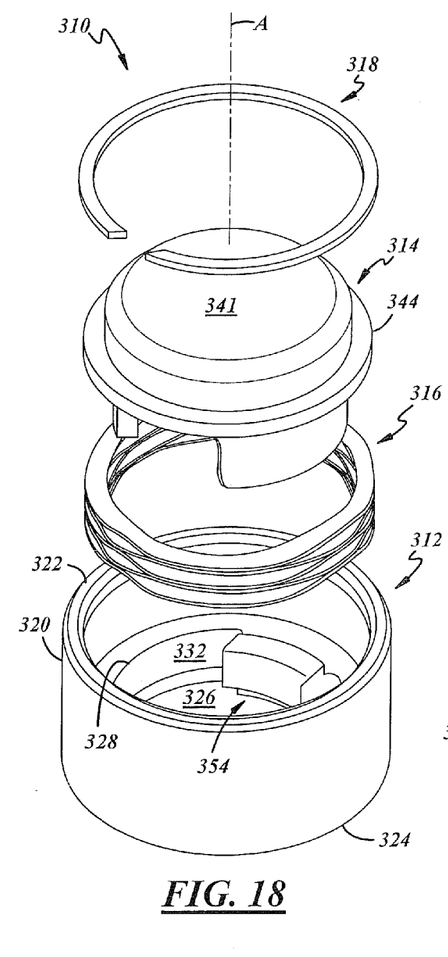
FIG. 18 is an exploded, perspective view of the threadless nut of FIG. 17.
Figure 19:
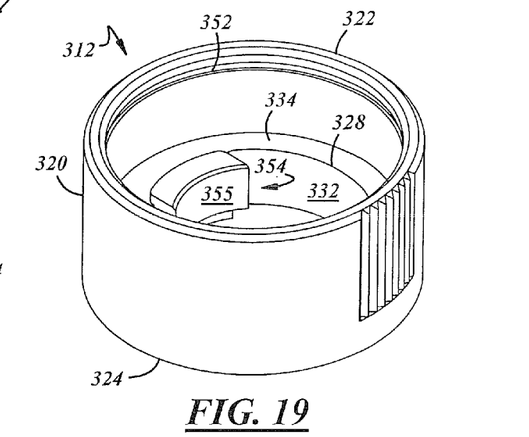
FIG. 19 is an upper perspective view of a collar of the threadless nut of FIG. 17.
Figures 20, 21, 22, 23:
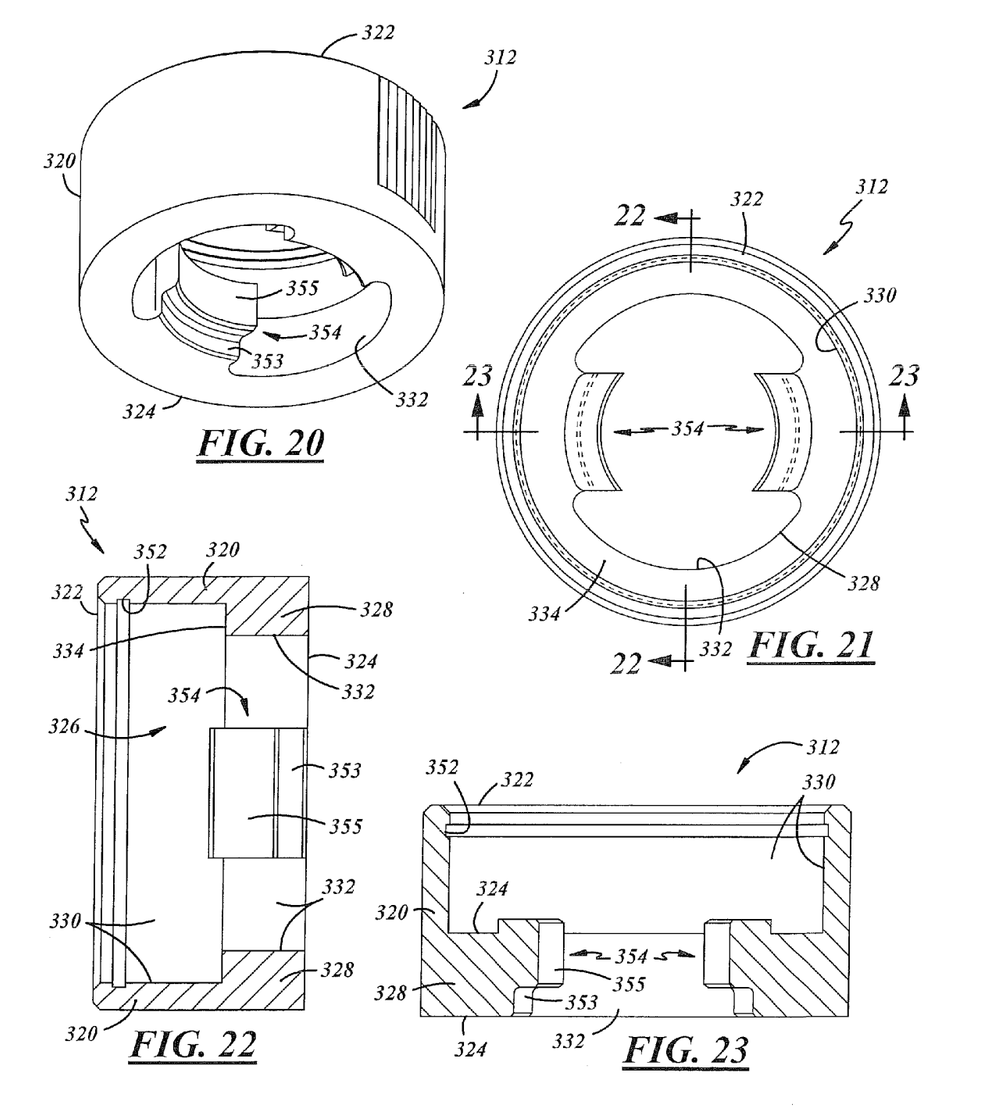
FIG. 20 is a lower perspective view of the collar shown in FIG. 19.
FIG. 21 is a top view of the collar shown in FIG. 19.
FIG. 22 is a cross-sectional view of the collar shown in FIG. 19, taken along line 22-22 of FIG. 21.
FIG. 23 is a cross-sectional view of the collar shown in FIG. 19, taken along line 23-23 of FIG. 21.
Figures 24, 25:
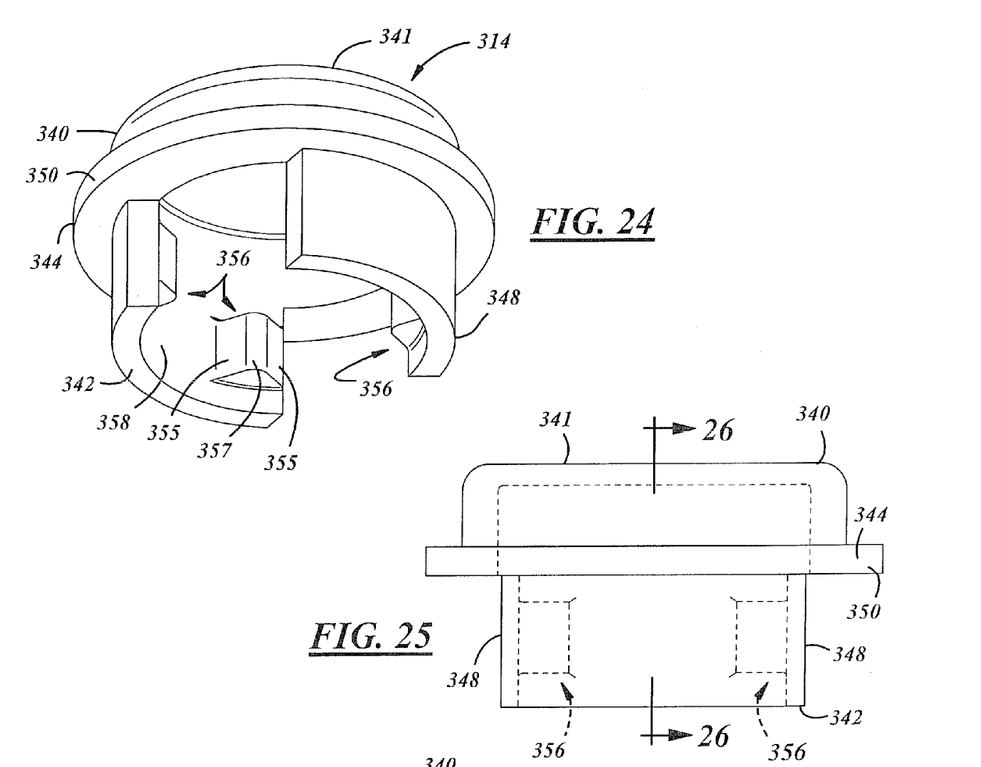
FIG. 24 is a perspective view of a cap of the threadless nut of FIG. 17.
FIG. 25 is a side view of the cap shown in FIG. 24.

Referring now to FIGS. 17 and 18, a nut 310 generally includes a collar 312 and a lock 314 carried by the collar 312 in any suitable manner. For example, the lock 314 is coupled to the collar 312 in a rotationally fixed but axially movable manner. The nut 310 may be a generally cylindrical device, wherein the collar 312 and the lock 314 may be generally cylindrical components.

As shown in FIG. 18, the nut 310 also includes a spring 316 to bias the collar 312 and the lock 314 in a general direction away from one another, and a retainer 318 to retain the lock 314 to the collar 312. To assemble the nut 310, the spring 316 is disposed between the collar 312 and the lock 314, the lock 314 is compressed against the spring 316 and the collar 312, and the retainer 318 is coupled to the collar 312 while the lock 314 is compressed. Once the retainer 318 is coupled to the collar 312, compression on the lock 314 may be released. Thus, the nut 310 may be a self-contained assembly.

Referring generally to FIGS. 18-23, the collar 312 includes an axially extending wall 320 extending between first and second ends 322, 324, a stepped passage 326 surrounded by the wall 320 and defined by a radially extending wall 328 (FIGS. 22-23) having inner surfaces 332 (FIGS. 22-23) to cooperate with corresponding portions of the lock 314 (FIG. 18), a counterbore 330 for the spring 316 (FIG. 18), and a shoulder 334 therebetween. The collar 312 also includes a retainer groove 352 in the wall 320 adjacent the first end 322. The wall 320 may include alternating castellations and openings (not shown) circumferentially spaced in the first end 322 to assist with removal of the retainer 318. The collar 312 also includes translational retaining lugs 354 extending radially inwardly from the radially extending wall 328. The lugs 354 project inwardly from the inner surfaces 332 and may be semi-circumferential or arcuate and may be stepped to include pilot portions 353 and lug engagement portions 355 that project axially beyond the shoulder 334.

Figure 26:
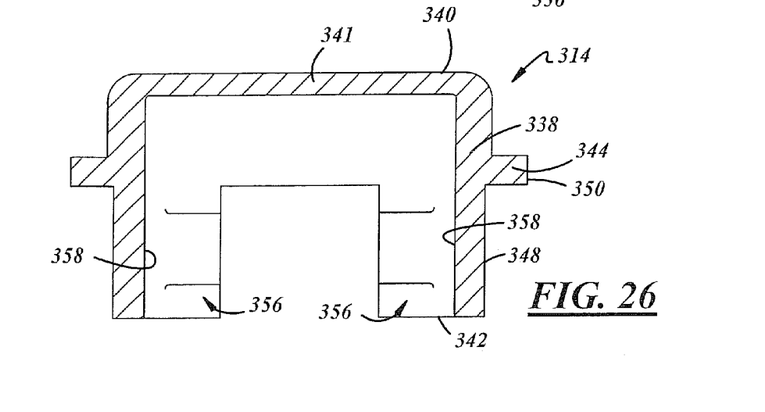
FIG. 26 is a cross-sectional view of the cap shown in FIG. 24, taken along line 26-26 of FIG. 25.

Referring generally to FIGS. 18 and 24-26, the lock 314 includes an axially extending wall 338 (FIG. 26) extending between first and second ends 340, 342. The lock 314 further includes a radially extending flange 344 that extends radially outwardly from the axially extending wall 338 to cooperate with the spring 316 (FIG. 18). The lock 314 also includes a barrel outer diameter 348 to cooperate with the minor diameter 328 of the collar 312 (FIG. 18), and a flange outer diameter 350 to cooperate with the counterbore 330 of the collar 312 (FIG. 18). The lock 314 additionally may include a radially extending wall 341 to assist with manual depression of the lock 314 toward the collar 312. Alternatively, the wall 341 may be omitted and/or a radially outwardly extending flange may be provided, for example, similar to that of the first exemplary embodiment. The lock 314 also carries rotational locking lugs 356, wherein the translational retaining lugs 354 may be disposed circumferentially between the rotational retaining lugs 356 in assembly. For example, the lock 314 includes an inner surface 358 from which the lugs 356 inwardly project. As best shown in FIG. 26, the lugs 356 include sides 355 that may be disposed approximately 90 degrees with respect to one another, and a radiused nose 357 between the sides 355. The lugs 356 may be axially spaced from the second end 324 and/or from the flange 344.

Figure 27:
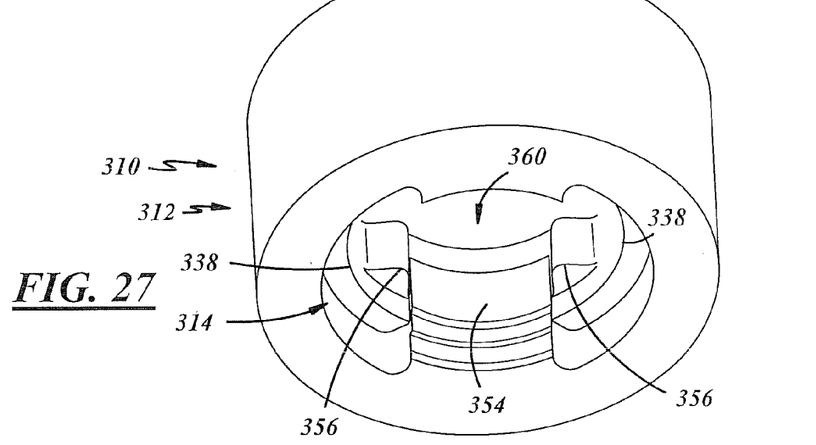
FIG. 27 is a lower perspective view of the threadless nut of FIG. 17.
Figure 28:
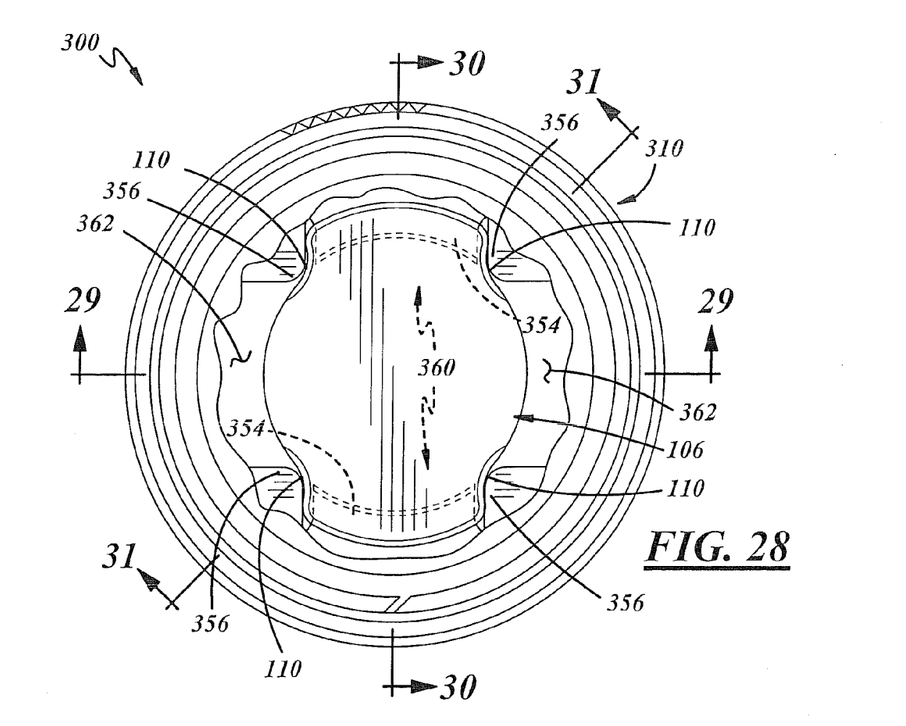
FIG. 28 is a fragmentary top view of the threadless nut of FIG. 17 shown mounted to the threadless stud of FIG. 4.
Figure 29:
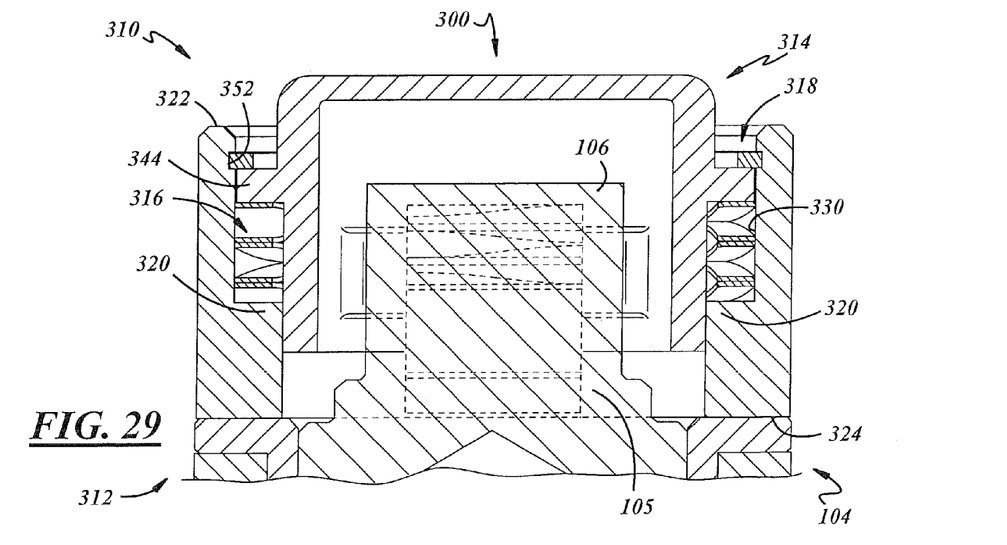
FIG. 29 is a cross-sectional view of the threadless nut and stud of FIG. 28, taken along line 29-29 of FIG. 28.

Referring to FIGS. 27 and 28, the lock 314 is rotationally coupled to the collar 312 by the translational retention lugs 354 of the collar 312 being disposed in the interruptions of the wall 338 of the lock 314 and between the rotational locking lugs 356 of the lock 314 and are axially movable with respect thereto. The lugs 354, 356 define stud lug seats 360 and stud lug clearance passages 362 therebetween. As shown in FIG. 28, the rotational locking lugs 356 are disposed in the fillets 110 of the stud 106 and cooperate with the radial end and side surfaces 108, 109 of the stud 106 to resist rotation of the nut 310 with respect to the stud 106. As shown in FIG. 29, the second end 324 of the collar 312 locates against the baffle arm collar 104

Referring to FIG. 29, the spring 316 is disposed between the flange 344 of the lock 314 and the radially extending wall 320 of the collar 312 to bias the lock 314 and collar 312 in a general direction away from each other. The spring 316 also biases the threadless nut 310 with respect to the baffle manifold segment 105 to resist rotation of the threadless nut 310 with respect to the segment 105 absent compression of the spring 316. The spring 316 may be a wave spring. For example, the spring may be a C200-L3-S17 wave spring available from Smalley Steel Ring Company of Lake Zurich, Ill. Any other suitable springs may be used, including coil springs, elastomeric springs, or the like.

As also shown in FIG. 29, the retainer 318 is disposed in the retainer groove 352 of the collar 312 such that the retainer 318 cooperates with the radially extending flange 344 of the lock 314 in assembly. The retainer 318 may be a snap ring. For example, the retainer 318 may be a M2300 internal retaining ring available from Truarc Company LLC of Phillipsburg, N.J. In another embodiment, the retainer 318 may be an integral portion of the collar 312, for example, a flange which may be upset, for example, after assembly of the collar 312, lock 314, and spring 316.

Figure 30:
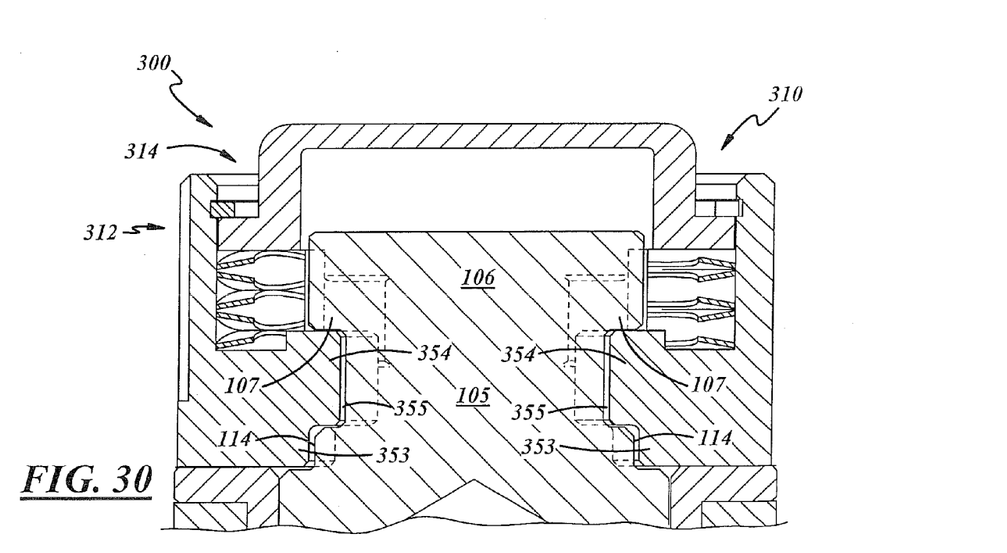
FIG. 30 is a cross-sectional view of the threadless nut and stud of FIG. 28, taken along line 30-30 of FIG. 28.
Figure 31:
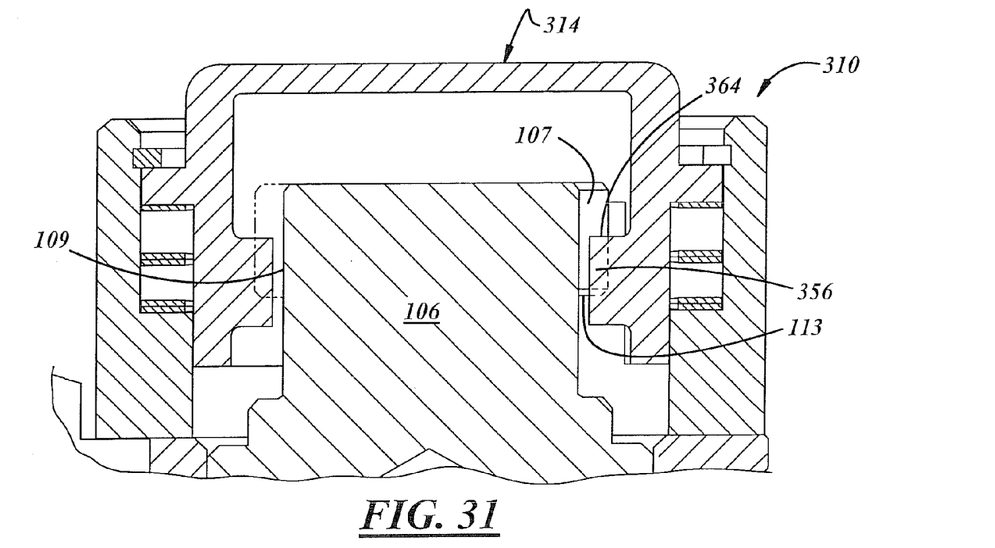
FIG. 31 is a cross-sectional view of the threadless nut and stud of FIG. 28, taken along line 31-31 of FIG. 28.
Figure 32:
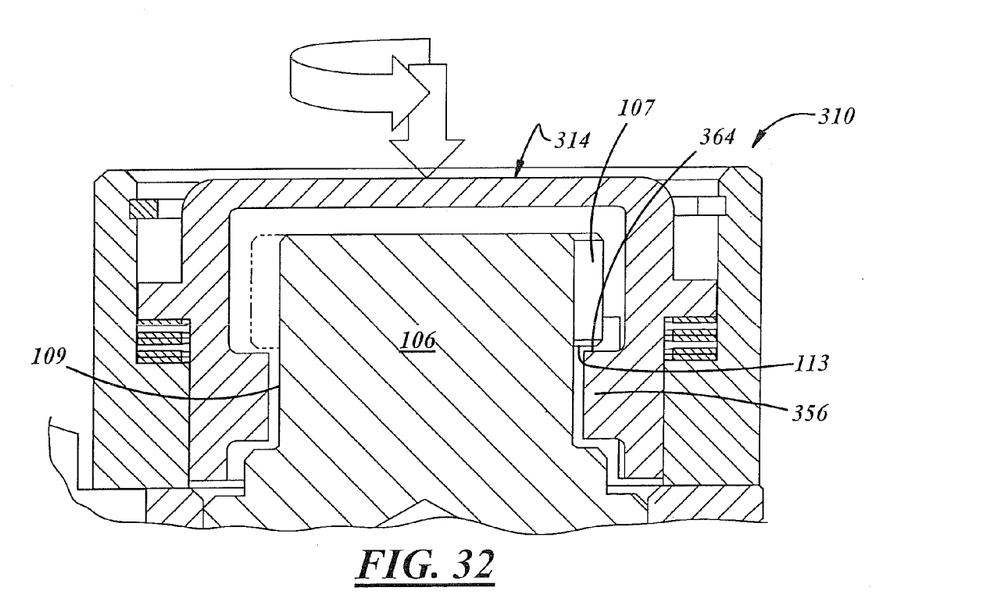
FIG. 32 is a cross-sectional view of the threadless nut and stud of FIG. 28, taken along line 32-32 of FIG. 28.

Referring to FIG. 30, the translational retaining lugs 354 are disposed behind the stud lugs 107 to axially retain the nut 310 to the stud 106. Also, the pilot portions 353 cooperate with a pilot diameter 114 of the segment 105. As shown in FIG. 31, the rotational locking lugs 356 are disposed adjacent the stud lugs 107 and axially overlap the side surfaces 109 of the stud lugs 107.

Figure 33:
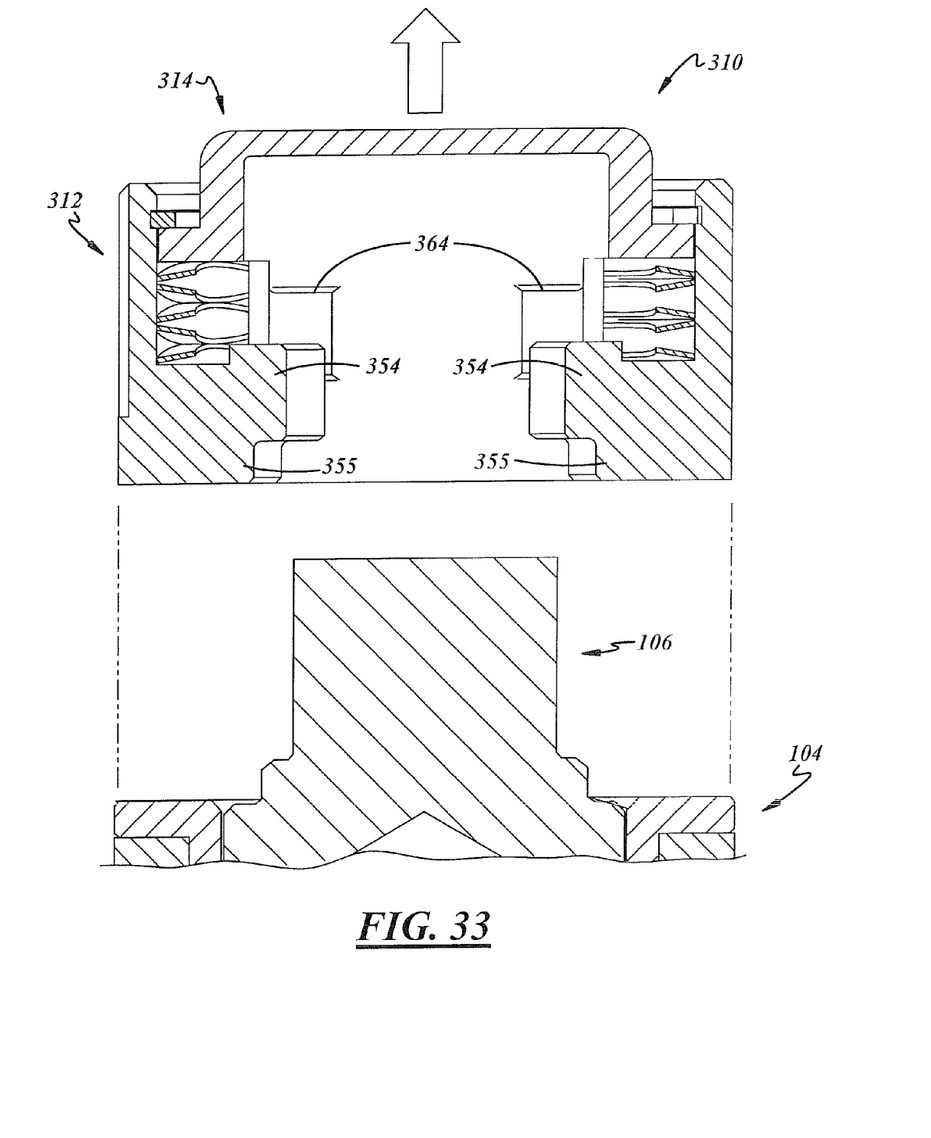
FIG. 33 is a cross-sectional view of the threadless nut and stud of FIG. 28 that is similar to the view of FIG. 29 and showing the nut removed from the stud.

Referring to FIG. 31, when it is desired to decouple the nut 310 from the stud 106, the lock 314 is compressed toward the collar 312 against the bias force imposed by the spring 316. Eventually, as the lock 314 is displaced toward the collar 312, the rotational retention lugs 356 become rotatably movable with respect to the stud lugs 107 when the rotational retention lugs 356 have axially moved with respect to the stud lugs 107 so as to axially clear the stud lugs 107. For example, top surfaces 364 of the rotational locking lugs 356 axially clear bottom surfaces 113 of the lugs 107 to permit the nut 310 to be rotated with respect to the stud 106. In the illustrated embodiment, when the nut 310 is rotated about 90 degrees the stud lugs 107 may pass between the lugs 354, 356. Accordingly, the nut 310 may be removed from the stud 106, as shown in FIG. 33.

To replace the nut 310, the nut 310 is placed over the stud 106 so that the stud lugs 107 pass between the lugs 354, 356, the nut 310 is advanced against the baffle arm collar 104 so that the lock 314 is compressed against the nut collar 312 such that the top surfaces 364 of the rotational locking lugs 356 axially clear bottom surfaces 113 of the lugs 107 to permit the nut 310 to be rotated with respect to the stud 106. In the illustrated embodiment, when the nut 310 is rotated about 90 degrees the translational retaining lugs 354 are disposed behind the stud lugs 107. Then, the compression on the lock 314 is removed so that the spring 316 advances the lock 314 against the stud lugs 107 so as to cradle the stud lugs 107 or seat the stud lugs 107 circumferentially between the rotational locking lugs 356.

Accordingly, the collar 312 is an axially stationary and circumferentially rotatable member of the nut 310, whereas the lock 314 is a member of the nut 310 that is both axially translatable and circumferentially rotatable.

A comparison of FIGS. 15 and 30 reveals a functional difference between the embodiments. As shown in FIG. 15, when the segment 105 of the baffle manifold 101 moves in an axial direction, for example, due to sudden engagement or disengagement of the manifold 101 with another portion of a glassware forming machine, the lock 214 will also move relative the collar 212. This is because a space S is provided between the lock 214 and the segment 105 to allow axial disengagement and circumferential clearance of the radial retaining lugs (not shown) with respect to the stud lugs 107. Such "play" may be acceptable for many applications. However, in applications where such play is undesirable, the embodiment shown in FIG. 30 may be preferred.

Referring again to FIG. 30, there is just enough axial spacing between axial surfaces of the segment pilot diameter 114 and the stud lugs 107 to permit engagement and disengagement of the translational retaining lugs 354 therebetween. Also, the lock 314 is located against the collar 104 of the baffle arm 102. Accordingly, for all intents and purposes, the lock 314 does not move relative to the nut collar 312 or the baffle arm collar 104.

The collars 212, 312 and locks 214, 314 may be manufactured, for example, by machining from blanks, near net or investment casting, or powder metal fabrication. The collar 212 and lock 312 may be composed of, for example, AISI 4140 steel ion nitrided to a hardness of 58-62 on the Rockwell C scale. The collar 312 and lock 314 may be composed of, for example, AISI 8620 steel carburized to a hardness of 54-58 on the Rockwell C scale and to a depth of about 0.8 mm. The collars 212, 312 and locks 214, 314 may be manufactured in any other suitable manner and may be composed of any other suitable materials.

There thus has been disclosed a threadless nut that fully satisfies all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. For example, the baffle arm assembly 100 presents just one exemplary environment of a myriad of possible environments for use with the threadless nuts 210, 310 of the present disclosure. Just a few examples include vehicle lug nuts, faucet spout nuts, or any application where tools and torque monitoring are not desired. The disclosure is intended to embrace all such modifications and variations as fall within the spirit and broad scope of the appended claims.

The invention claimed is:

1. A threadless nut that includes:
   a collar including an axially extending wall, a radially extending wall, and circumferentially spaced translational retention lugs extending radially inwardly from said radially extending wall; and
   a lock coupled to said collar and including a portion carrying circumferentially spaced rotational retention lugs projecting radially inwardly from an inner surface of said lock and positioned adjacent to and axially overlapping said translational retention lugs in a rest position, wherein said lock is axially movable with respect to said collar, and said translational and rotational retention lugs define stud lug seats and stud lug clearance passages therebetween.

2. The threadless nut set forth in claim 1, further comprising a spring disposed between said collar and said lock to bias said collar and said lock in a direction axially away from one another, and a retainer carried by said collar or said lock to axially retain said collar and said lock together, such that said threadless nut is a self-contained assembly.

3. The threadless nut set forth in claim 2, wherein said spring is a wave spring and said retainer is a snap ring coupled to said collar.

4. The threadless nut set forth in claim 1, wherein said collar includes a stepped passage surrounded by said axially extending wall and defined by said radially extending wall, a counterbore, and a shoulder between said counterbore and said radially extending wall, wherein said translational retention lugs extending radially inwardly from said inner surfaces of said radially extending wall, and said lock includes an axially extending wall, a flange extending radially outwardly from said axially extending wall and having a flange outer diameter to cooperate with said counterbore of said collar, a barrel outer diameter to cooperate with said radially extending wall of said collar, and an inner surface from which said rotational retention lugs inwardly project.

5. The threadless nut set forth in claim 1, wherein said lock is rotationally coupled to said collar by said translational retention lugs of said collar being disposed circumferentially between said rotational retention lugs, which are axially movable with respect to said translational retention lugs.

6. The threadless nut set forth in claim 1 wherein said lock includes a radially extending wall to assist with manual depression of said lock toward said collar.

7. A threadless nut that includes:
radially inwardly extending translational retention lugs circumferentially spaced apart and positionable behind lugs of a stud when said threadless nut is coupled to the stud; and
radially inwardly extending rotational retention lugs circumferentially spaced apart and positioned adjacent to said translational retention lugs, and positionable adjacent to the stud lugs such that said rotational retention lugs are axially overlappable with respect to the translational retention lugs when said threadless nut is coupled to the stud,
wherein said translational and rotational retention lugs define seats to receive the stud lugs and define passages circumferentially between said seats to allow passage of the stud lugs, said rotational retention lugs being axially movable with respect to the stud lugs, and rotatably movable with respect to the stud lugs when said rotational retention lugs are axially moved with respect to the stud lugs so as to axially clear the stud lugs.

8. The threadless nut set forth in claim 7 wherein a collar includes an axially extending wall, a radially extending wall, and said circumferentially spaced translational retention lugs extending radially inwardly from said radially extending wall, and a lock includes a portion carrying said circumferentially spaced rotational retention lugs positioned adjacent to and axially overlapping said translational retention lugs in a rest position, said lock being axially movable with respect to said collar, and said retention lugs define stud lug seats and stud lug clearance passages therebetween.

9. The threadless nut set forth in claim 8, wherein said collar includes a stepped passage surrounded by said axially extending wall and defined by said radially extending wall, a counterbore, and a shoulder between said counterbore and said radially extending wall, wherein said translational retention lugs extend radially inwardly from said radially extending wall, and said lock includes an axially extending wall, a flange extending radially outwardly from said axially extending wall and having a flange outer diameter to cooperate with said counterbore of said collar, a barrel outer diameter to cooperate with said minor diameter of said collar, and an inner surface from which said rotational retention lugs radially inwardly project, and said lock is rotationally coupled to said collar by said translational retention lugs of said collar being disposed circumferentially between said rotational retention lugs, which are axially movable with respect to said translational retention lugs.

10. The threadless nut of claim 7, wherein said rotational retention lugs are carried on a generally cylindrical lock, which is carried in a generally cylindrical collar.

11. A threadless nut that includes:
a collar including an axially extending collar wall surrounding a collar passage;
a lock carried in the collar and including:
an axially extending lock wall disposed in the collar passage,
an inner surface,
circumferentially spaced apart rotational retention lugs projecting from the inner surface; and
translational retention lugs carried by one of the collar or the lock and positioned circumferentially between the rotational retention lugs such that the rotational retention lugs axially overlap the translational retention lugs in a rest position, wherein the translational and rotational retention lugs define seats to receive stud lugs and define passages circumferentially between the seats to allow passage of the stud lugs.

12. The threadless nut of claim 11, wherein the collar passage is a stepped passage including a minor diameter and the lock includes an outer diameter to cooperate with the minor diameter of the collar passage.

13. The threadless nut of claim 11 wherein the collar includes the translational retention lugs.

14. The threadless nut of claim 13 wherein the translational retention lugs project radially inwardly from a radially extending wall of the collar, are arcuate, and are stepped to include pilot portions and lug engagement portions.

* * * * *